United States Patent
Gupta et al.

(10) Patent No.: US 7,295,981 B1
(45) Date of Patent: Nov. 13, 2007

(54) METHOD FOR BUILDING A NATURAL LANGUAGE UNDERSTANDING MODEL FOR A SPOKEN DIALOG SYSTEM

(75) Inventors: Narendra K. Gupta, Dayton, NJ (US); Mazin G. Rahim, Warren, NJ (US); Gokhan Tur, Morris Plains, NJ (US); Antony Van der Mude, Hackettstown, NJ (US)

(73) Assignee: AT&T Corp., New York, NY (US)

( * ) Notice: Subject to any disclaimer, the term of this patent is extended or adjusted under 35 U.S.C. 154(b) by 783 days.

(21) Appl. No.: 10/755,014

(22) Filed: Jan. 9, 2004

(51) Int. Cl.
*G10L 15/18* (2006.01)

(52) U.S. Cl. .......................... 704/257; 704/9; 704/270

(58) Field of Classification Search ................ 704/257, 704/270, 275, 9
See application file for complete search history.

(56) References Cited

U.S. PATENT DOCUMENTS

| | | | |
|---|---|---|---|
| 6,219,643 B1* | 4/2001 | Cohen et al. ................ | 704/257 |
| 6,529,871 B1* | 3/2003 | Kanevsky et al. .......... | 704/246 |
| 6,735,560 B1* | 5/2004 | Epstein .......................... | 704/9 |
| 6,754,626 B2* | 6/2004 | Epstein ....................... | 704/235 |
| 7,003,463 B1* | 2/2006 | Maes et al. ............... | 704/270.1 |
| 7,143,035 B2* | 11/2006 | Dharanipragada et al. .. | 704/244 |
| 2003/0216905 A1* | 11/2003 | Chelba et al. ................. | 704/9 |

OTHER PUBLICATIONS

M. El-Beze, C.de Loupy and P. -F. Marteau, "Using Semantic Classification Trees For WSD", Laboratorie d" Informatique d'Avignon (LIA) , BP 1228, F-84911 Avignon Cedex 9 (France) , Bertin Technologies, ZI des Gatines-B.P.3, F-78373 Plaisir cedex.
Stephen Patel, Joseph Smarr, 'Automatic Classification of Previously Unseen Proper Noun Phrases into Semantic Catefories Using an N-Gram Letter Model', CS 224N Final Project, Stanford University, Spring 2001.

(Continued)

*Primary Examiner*—Vijay Chawan

(57) ABSTRACT

A method of generating a natural language model for use in a spoken dialog system is disclosed. The method comprises using sample utterances and creating a number of hand crafted rules for each call-type defined in a labeling guide. A first NLU model is generated and tested using the hand crafted rules and sample utterances. A second NLU model is built using the sample utterances as new training data and using the hand crafted rules. The second NLU model is tested for performance using a first batch of labeled data. A series of NLU models are built by adding a previous batch of labeled data to training data and using a new batch of labeling data as test data to generate the series of NLU models with training data that increases constantly. If not all the labeling data is received, the method comprises repeating the step of building a series of NLU models until all labeling data is received. After all the training data is received, at least once, the method comprises building a third NLU model using all the labeling data, wherein the third NLU model is used in generating the spoken dialog service.

18 Claims, 2 Drawing Sheets

OTHER PUBLICATIONS

Jian-Yun Nie, Mingwen Wang, "A Latent Semantic Structure Model for Text Classification", DIRO, Universite'de Montreal, Quebec, H3C3J7 Canada, School of Computer Science and Technology, Jiangxi Normal University, 330027, Nanchang, Jiangxi, China.

Egbert Ammicht, Allen Gorin, Tirso Alonso, "Knowledge Collection for Natural Language Spoken Dialog Systems", Eurospeech, 1999.

Paul C. Constantinides, Alexander Rudnicky, "Dialog Analysis In the Carnegie Mellon Communicator", Eurospeech 1999.

Jongho Shin, Shrikanth Narayanan, Laurie Gerber, Abe Kazemzadeh, Dani Byrd, "Analysis of User Behavior Under Error Conditions in Spoken Dialogs", printed Dec. 2003.

* cited by examiner

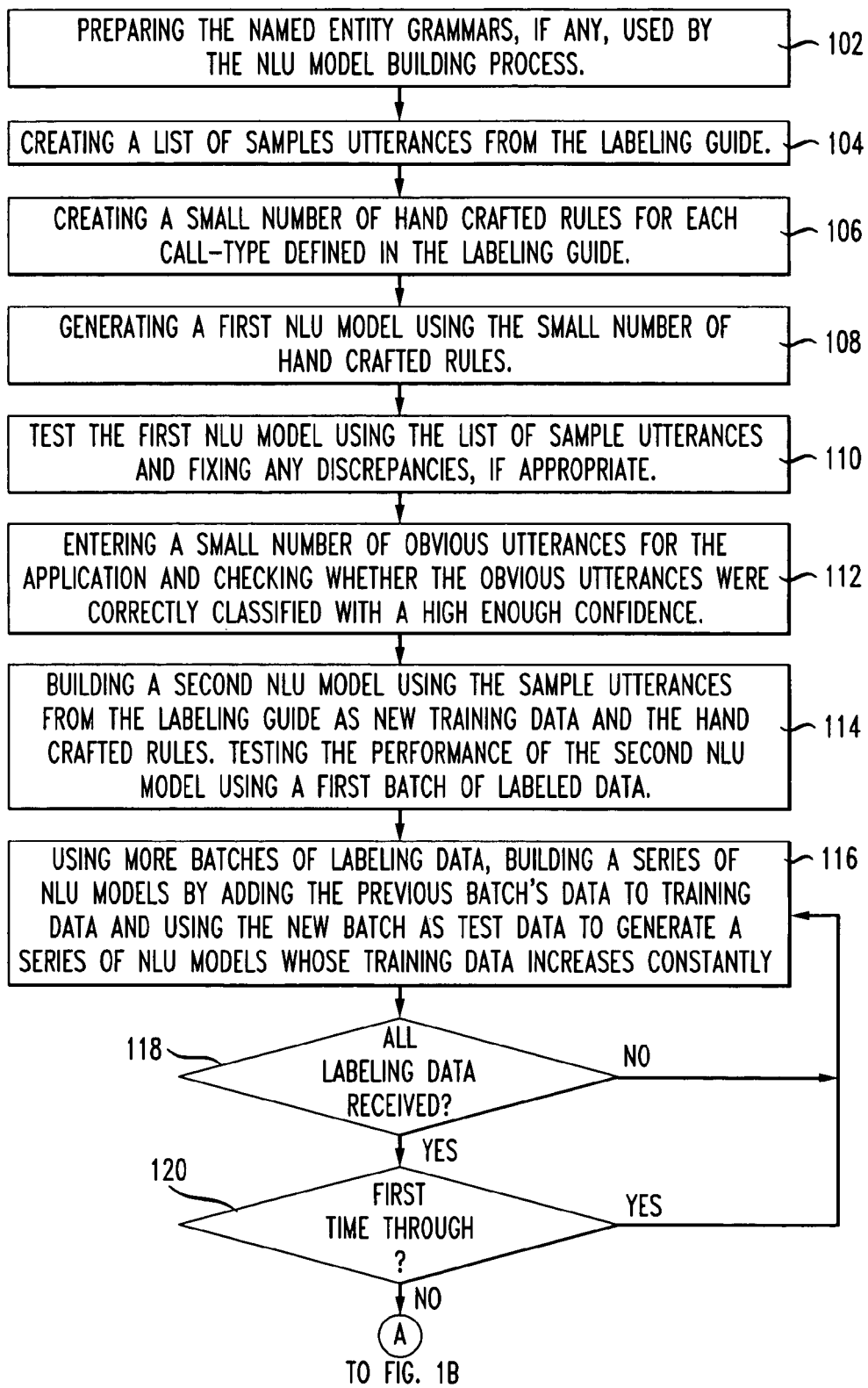

METHOD FOR BUILDING A NATURAL LANGUAGE UNDERSTANDING MODEL FOR A SPOKEN DIALOG SYSTEM

BACKGROUND OF THE INVENTION

1. Field of the Invention

The present invention relates to spoken dialog systems and more specifically to a method of building a spoken language understanding module within a spoken dialog system.

2. Introduction

Spoken dialog systems typically include a variety of core modules that receive and process data to understand speech from a user and prepare an appropriate response. These modules include an automatic speech recognition module, a spoken language understanding module, a dialog management module and a text-to-speech module. To generate the speech models in order to create an effective spoken dialog system for a particular application, such as the AT&T VoiceTone[SM] service that assists users with telephone billing and account questions, requires a large amount of specialized work by developers to create the various modules that will work in the application's context. The present invention will relate to the spoken language understanding portion of a spoken dialog system. There is much information available related to the basic process of generating spoken dialog systems. Accordingly, no further information is provided herein other than this introduction.

There is no single way of building a spoken language model for a spoken dialog system. Typically, the same data, tools and labeling guide may be used by different developers but can result in completely different models with varying performance capabilities. Furthermore, given the variety of contexts in which spoken dialog systems may be developed, there may be differences in models with difference performance characteristics based on the context of the spoken dialog systems. For example, various development projects depending on the context (airline reservation service, bank account management service, auction service, etc.) can vary in the process by which a developer may create the spoken language understanding portion of the spoken dialog system. What is needed in the art is a process that is uniform over most development projects and that can further lead to reproducible results.

SUMMARY OF THE INVENTION

The present invention relates to a process between an initial planning meeting in a process of creating a spoken dialog system to the release of the dialog system. The process is a step-by-step approach to building the natural language understanding model for the dialog system.

A method of generating a natural language model for use in a spoken dialog system is disclosed. The method comprises using sample utterances and creating a number of hand crafted rules for each call-type defined in a labeling guide. A first NLU model is generated and tested using the hand crafted rules and sample utterances. A second NLU model is built using the sample utterances as new training data and using the hand crafted rules. The second NLU model is tested for performance using a first batch of labeled data. A series of NLU models are built by adding a previous batch of labeled data to training data and using a new batch of labeling data as test data to generate the series of NLU models with training data that increases constantly. If not all the labeling data is received, the method comprises repeating the step of building a series of NLU models until all labeling data is received. After all the training data is received, at least once, the method comprises building a third NLU model using all the labeling data, wherein the third NLU model is used in generating the spoken dialog service.

Another embodiment of the invention relates to a NLU model generated according to a method disclosed herein and a spoken dialog service having an NLU model generated according to a process disclosed or suggested herein.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A illustrates a flowchart showing a method of generating a natural language model in a spoken dialog system according to an aspect of the invention;

DETAILED DESCRIPTION OF THE INVENTION

Figure 1B:
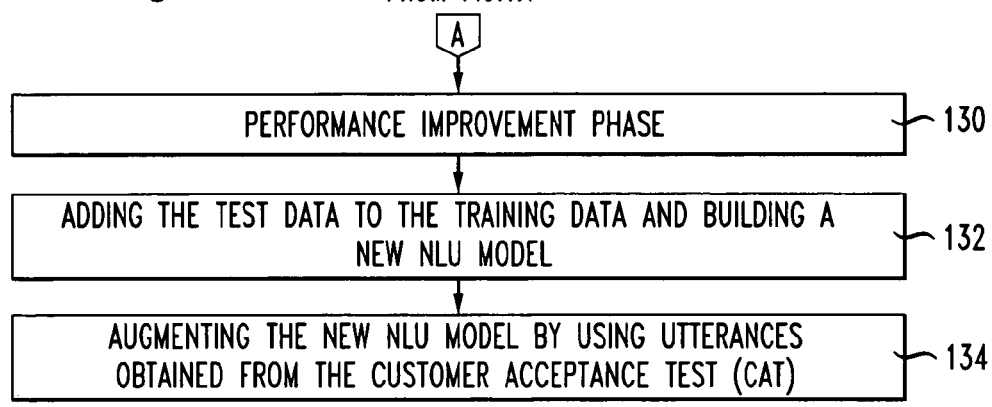
FIG. 1B shows a continuation of the flowchart of FIG. 1A according to an aspect of the invention.

The process of building a spoken dialog system or service is time-consuming, expensive and requires highly-skilled developers. There is a need to improve the process in order to make the use of spoken dialog services more available to companies to improve their interactions with customers. As mentioned above, a spoken dialog service requires several modules to manage the flow of data between receiving a spoken phrase from a user to generating a synthetic voice response to the user statement. One of these modules is the spoken language or natural language understanding (NLU) module. This module enables the computer interacting with the user to understand the user's desires and intent by analysis of a user spoken phrase. To prepare the NLU modules to understand user intent and desire based on spoken phrases requires training and generation of NLU language models in the given.

Typically, if a company like AT&T desires to incorporate a spoken language dialog to provide a spoken interface to their company, a labeling guide is prepared in advance of the process. The labeling guide includes call-types along with example utterances and named entities. A call-type is created by inspecting a group of typical call requests or expected inquiries for the specific application. For example, if the context is personal banking, a call-type may be Request (Balance), wherein the user calls the service to determine the balance in their checking account. Example utterances in the labeling guide may be: "I need to find out the balance in my checking account" and "How much money do I have in checking?". Both these example utterances would be assigned the Request (Balance) call-type. The labeling staff needs to learn all about the context of an application to be developed and to learn how to label recorded utterances appropriately.

The labeling guide is an extensive document that instructs those that will be performing the labeling process on utterances. The process described herein is defined as occurring after the list of intends or call-types have been determined in the labeling guide. The invention relates to a method of building an NLU model using pre-pilot data. A database of utterances is then labeled using the labeling guide. The database may be recordings of interactions with customers and a call center. The database may also be specifically developed with staged conversations that simulate real calls.

FIG. 1A illustrates the method according to the main embodiment of the invention. This method presumes that the labeling guide for the specific application is already prepared. The guide must include call-types along with at least some example utterances, although this is not absolutely necessary as shall be seen below. Finding some example utterances is helpful in practice terms in practicing the method. Named entities should also be included in the labeling guide. As will be appreciated, one of the benefits of the method is utilizing a well-crafted and complete labeling guide in the process of building SLU models for spoken dialog systems. In practice, there may always be changes and improvements to the labeling guide as the spoken dialog service is created. However, these changes should be considered minor. In more dramatic situations, some work on the SLU models may need to be redone based on labeling guide changes. The terms SLU model and NLU model are essentially interchangeable.

The method comprises preparing the named entity grammars (if any) for use in the SLU model building process (102) and creating a list of sample utterances from the labeling guide for the different call-types (104). In this regard, having several example utterances in the labeling guide is very helpful. They may be found in a single list or spread throughout the labeling guide. However, if no example utterances are found, or if only a few are found, some example utterances may be created as part of this process. Next the method comprises creating a small number of hand crafted rules for each call-type defined in the labeling guide (106). Exemplary rules include significant words that have high association with a given call-type or simple phrases that appear to be salient for a given call-type. These hand crafted rules may also be significant verb-noun pairs or some other configuration or words or symbols to represent or have a high-association with the various call-types. An example of a hand crafted rule is as follows:

Request(Balance)#account balance|owe#0.9
Request(Call Transfer)#(talk|speak) to a?
(human|person|somebody|(customer service)?representative)#0.8

With the hand crafted rules, the method next comprises generating a first NLU model using the small number of hand crafted rules (108) and testing the first NLU model using the list of sample utterances, while identifying and if appropriate, fixing any discrepancies (110). The performance of the first NLU model should be close to 100% given that the test data is the example utterances. To further test the first NLU model, the next step is entering a small number of obvious utterances for the application and checking whether the obvious utterances were correctly classified with a high enough level of confidence (112). This process gives the developer an initial understanding of how the system will work.

As mentioned above, part of the development process involves labelers (people or a programmed computing device) labeling utterances according to the instructions set forth in the labeling guide. Once some labeled data (a first batch of labeling data) is available, the next step in the process can be practiced. There is no specific amount of labeling data that must be available according to the practice of the invention. Those of skill in the art will understand when an appropriate amount of labeling data has been generated by the labelers. Continuing with FIG. 1A, the next step comprises using the labeling guide examples (or created examples if the labeling guide has none or an insufficient number of examples) as the new training data to build another NLU model in addition to the hand crafted rules generated in step (106) and testing the performance of this NLU model using the first batch of labeling data (114). At this stage, it is not uncommon to experience low performance from the NLU model.

Once the labeling lab provides more batches of labeling data, the next step comprises using the more batches of labeling data, building a series or plurality of NLU models by adding the previous batch's data to the training data, and then using the new batch as test data to generate a series of NLU models whose training data increases constantly (116). Most developers at this point will maintain a copy of the performance of each NLU model to track the learning curve. The method comprises repeating step (116) until all the data is received from the labeling lab (118). The series of NLU models are evaluated as more labeling data becomes available. The performance improvement should be followed while the additional data is added. The performance of the NLU models should be improving and then converging as the developer moves closer to receiving all the labeling data from the labeling lab.

After step (118), there are a variety of different types of analyses that may be performed. For example, the developer may want to produce a count of the number of examples of each class, which is the histogram of the call-types. Typically, if less than 1% of the examples are of a particular call-type, the identification of that call-type will be unreliable, and more data may have to be collected. If there are less than 1% of examples, the developer should consider augmenting training with handcrafted rules for that call-type. In general, the less number of training utterances for a given call-type, the less reliable the recognition of that call-type. Therefore, if an important call-type for a particular application does not appear in the training data frequently enough, the developer writes hand crafted rules to handle the call-type. Another type of analysis that is available at this stage is to check the confusion matrix (described more below) to determine if the hand crafted rules add to, or detract from the accuracy of the call-types.

Step (120) requires determining whether in the process this is the first time through the process. The reason for this is that once all the labeling data is received, the process requires repeating step (116) using all the labeling data. Now the developer is studying the performance of the NLU models being generated using all the data. Although the flowchart shows only transitioning to step (116) from step (120) on the first pass through, this is not a critical requirement and even on the second, third or more passes through step (120), the process may repeat again starting with step (116).

In the best mode of practicing the invention, after the first pass through step (120), the method comprises entering a performance improvement phase and deployment phase (130) shown in FIG. 1B. In this phase, several approaches may be followed. For example, the developer may check the performance without the examples of the labeling guide. If the performance is better without the labeling guide examples, then the developer continues without them, otherwise, the developer should use the labeling guide examples. The developer may ignore utterances longer than some threshold, such as, for example, fifty words, in the training data, while keeping the test data the same. If this approach improves performance, then continue with the training data without the longer utterances. If the utterances are labeled from human-to-human interactions, then the developer may in advance instruct the labeling label to not even label longer than a threshold such as 80 words.

Another approach available to the developer in the performance improvement phase (130) is to use readily available data for some of the call-types for training. However, the developer should be careful in doing this especially when the data is from a different application. The developer should also be careful about the amount of data that he or she is using. There should not be too much data in the training data for a low frequency call-type. Keeping the text data always the same enables the developer to check whether the performance improvement phase is working for a specific approach. The performance should be checked after including each set of data for a particular call-type.

Other options available during this performance improvement phase (130) comprise updating the hand crafted rules. With updated rules, check the effect of them by retraining the NLU model. Further, the developer can write specific rules for low-frequency call-types or call-types whose examples are rejected with low confidence. The confusion matrix will be useful in this approach. A confusion matrix is a table showing actual class membership of utterances in a test sample versus the class into which the utterance is classified by the NLU. The table can summarize both the overall accuracy of classification (the main diagonal) and relative levels of various types of misclassifications. Generally, the rules written by the developer do not affect the performance a lot since they are intended for low frequent call-types, but these performance enhancement suggestions increase the coverage of the NLU model.

After the performance enhancement phase (130), the method comprises adding the test data to the training data and building a new NLU model (132). At this stage, the more data that is available to use, the better the performance will be. Finally, before deploying a pilot spoken dialog system, the method comprises augmenting the NLU model by using the utterance obtained from the customer acceptance test (CAT). The use of this data is to help obtain a more representative human-machine data that includes replies to confirmation prompts.

While the method outlined in FIGS. 1A and 1B provides some specific steps to practice in generating an NLU model for a spoken dialog service, there are some alternatives to these steps that may be considered. As seen, the process defined in the previous section is very specific, and may be defined in many other ways.

For example, the order of each step is not necessarily in any particular order. The hand crafted rule writing step (106) and tuning process (116-120) can be done at any time in the process. In another example, the developer may decide to ignore the examples in the labeling guide completely or after some point in the process they may no longer be used. In this case, whenever there is a reference in the process to the sample utterances from the labeling guide, the reader should substitute other utterances such as developer-generated utterance and the like. Steps (116) and (118) may be replaced by other alternatives such as: (1) mixing all the data and dividing it into training data and test data by a ratio. (Making round-robin tests is considered to be in this category); (2) keeping a fixed test set and using all other data for training; and (3) mixing all the data and dividing it into training data and test data, for example, by accumulating the test data into one text set and re-running all of the previous models on this cumulative test set to get a good comparison.

Ideally the labeling lab determines the batches, but alternately, the amount of batches may be determined by the developer. One extreme example would be to accept all the data as one batch and wait until all the labeling is completed.

Furthermore, the performance improvement phase in step (130) may be performed after each step after step (108) and step (102) may be delayed indefinitely. Although preferable, the named entity grammars do not need to be prepared in advance of practicing the invention.

Embodiments within the scope of the present invention may also include computer-readable media for carrying or having computer-executable instructions or data structures stored thereon. The data or instructions may either relate to the process set forth in the above disclosure or may store a NLU model, NLU module, or spoken language dialog service generated according to the process set forth herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions of data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 2:
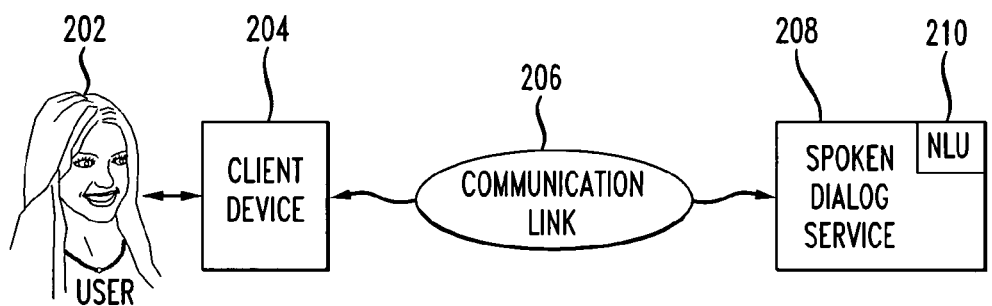
FIG. 2 illustrates an example system according to the present invention.

Although the above description may contain specific details, they should not be construed as limiting the claims in any way. Other configurations of the described embodiments of the invention are part of the scope of this invention. For example, while the steps for generating a NLU model are described, the invention also covers spoken dialog services having an NLU module generated as set forth above. The spoken dialog service generated according to the present invention may be accessible to a user via the world-wide-web or any known or developed communication link, including a wireless or landline link. The configuration may be in a client-server context or other context. It is immaterial to the present invention where physical location any software component is processed in a network context. FIG. 2 illustrates the basic concept of a user 202 communicating via a client device 204 such as a computer or telephone. The communication link 206 may be wireless or landline and may be of any known type. The spoken dialog system 208 includes the NLU module 210 generated according to the steps set forth above. Accordingly, the appended claims and their legal equivalents should only define the invention, rather than any specific examples given.

We claim:

1. A method of generating a natural language understanding (NLU) model for use in a spoken dialog service, the method comprising:
   (a) using sample utterances, creating at least one hand crafted rule for each call-type defined in a labeling guide, wherein each call-type comprises a call category with at least one defined attribute;
   (b) generating and testing a first NLU model using the at least one hand crafted rule and sample utterances;
   (c) building a second NLU model using the sample utterances as new training data and using the at least one hand crafted rule;
   (d) testing the performance of the second NLU model using a first batch of labeled data;
   (e) building a series of NLU models by adding a previous batch of labeled data to training data and using a new batch of labeling data as test data to generate the series of NLU models with training data that increases constantly;
   (f) if not all the labeling data is received, repeat step (e) until all labeling data is received; and
   (g) after all the training data is received, at least once, building a third NLU model using all the labeling data, wherein the third NLU model is used in generating the spoken dialog service.

2. The method of claim 1, further comprising:
   identifying at least one obvious utterance with a known classification;
   applying the at least one obvious utterance to the NLU model; and
   checking whether the at least one obvious utterance was correctly classified by the NLU model.

3. The method of claim 1, further comprising:
   (h) performing an improvement performance step on the third NLU model;
   (i) adding the test data to the training data and building a fourth NLU model; and
   (j) augmenting the fourth NLU model using utterances obtained from a customer acceptance test.

4. The method of claim 3, further comprising ignoring the utterances that are longer than a specific threshold.

5. The method of claim 4, wherein the threshold is 50 words.

6. The method of claim 1, wherein if the sample utterances are human-human utterances, the method further comprises not labeling utterances longer than a threshold amount.

7. The method of claim 6, wherein the threshold is 80 words.

8. The method of claim 1, wherein some examples in the labeling guide are ignored.

9. The method of claim 1, wherein the step of building a series of NLU models by adding a previous batch of labeled data to training data and using a new batch of labeling data as test data to generate the series of NLU models with training data.

10. A method of generating a natural language understanding (NLU) model for use in a spoken dialog service, the method comprising:
    (a) building a first NLU model using sample utterances from a labeling guide, hand crafted rules and labeled utterances of available human/human dialogs or human/machine dialogs, if available:
    (b) testing the performance of the first NLU model using sample utterances in the labeling guide; and
    (c) building a series of NLU models and evaluating the performance of the series of NLU models as labeled data becomes available by:
       (i) adding a previous batch of labeled data to training data; and
       (ii) using a new batch of labeling data as test data to generate the series of NLU models with training data that increases constantly.

11. The method of claim 10, wherein the step of building a series of NLU models further comprises mixing all the data and dividing the mixed data into training data and test data.

12. The method of claim 10, wherein the step of building a series of NLU models further comprises keeping a fixed text set and using all other data for training.

13. The method of claim 10, wherein the step of building a series of NLU models further comprises mixing all the data and dividing it into training and text data.

14. The method of claim 10, wherein one batch containing all the data is received after completion of all the data labeling.

15. A natural language understanding (NLU) model for use in a spoken dialog system, the NLU model generated according to a process comprising:
    (a) building a first NLU model using sample utterances from a labeling guide, hand crafted rules and labeled utterances of available human/human dialogs or human/machine dialogs, if available:
    (b) testing the performance of the first NLU model using sample utterances in the labeling guide; and
    (c) building a series of NLU models and evaluating the performance of the series of NLU models as labeled data becomes available by:

(i) adding a previous batch of labeled data to training data; and
(ii) using a new batch of labeling data as test data to generate the series of NLU models with training data that increases constantly.

16. The NLU model of claim 15, wherein the NLU model is generated by a method further comprising:
augmenting the series of NLU models using utterances obtained from a customer acceptance test.

17. The NLU model of claim 16, wherein the NLU model is generated by a method further comprising ignoring the utterances that are longer than a specific threshold.

18. The NLU model of claim 16, wherein if the sample utterances are human-human utterances, the method further comprises not labeling utterances longer then a threshold amount.

* * * * *